May 22, 1928.
C. E. WEBBER
HARROW
Filed Sept. 2, 1927
1,670,602
2 Sheets-Sheet 1
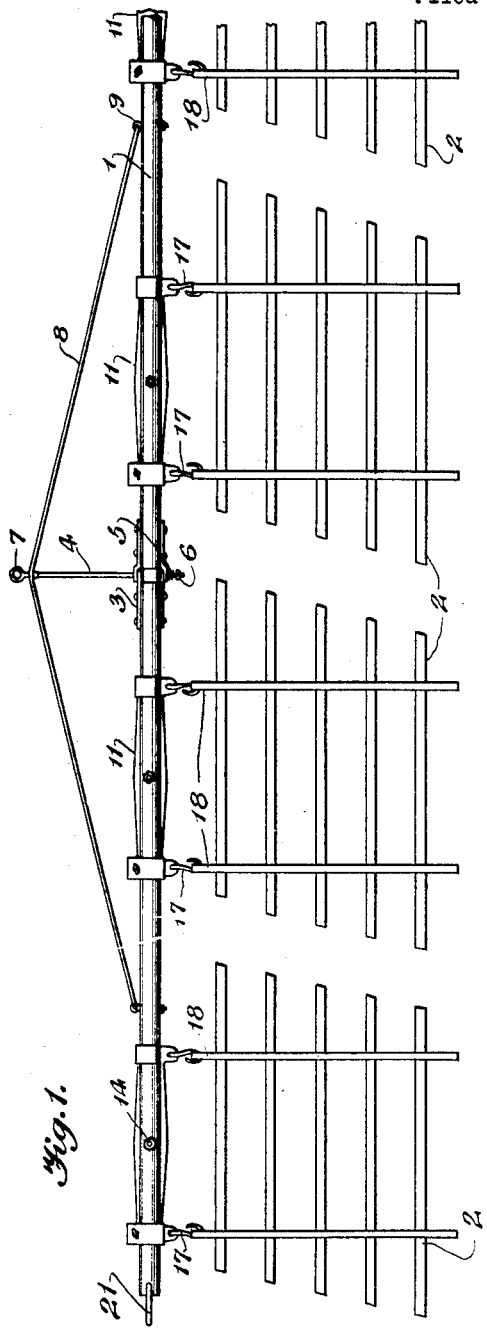
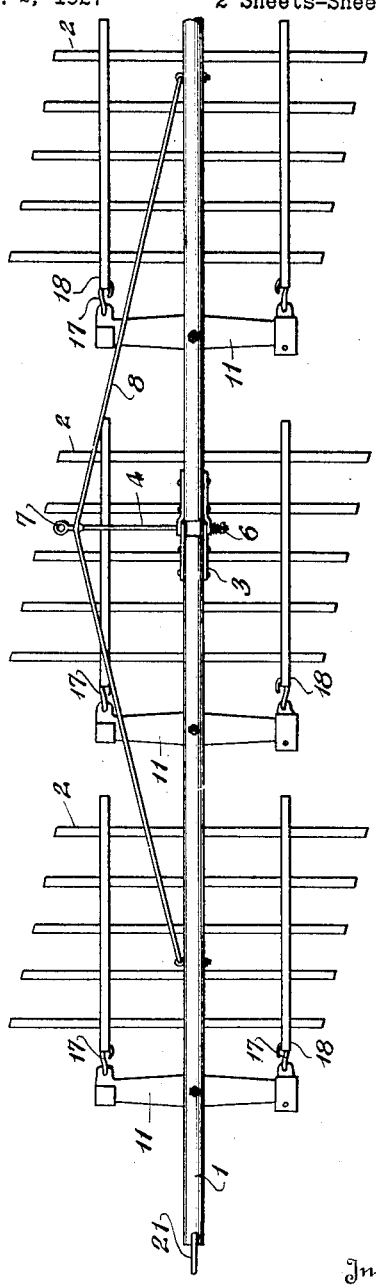
Inventor
Charles E. Webber
By William C. Linton.
Attorney

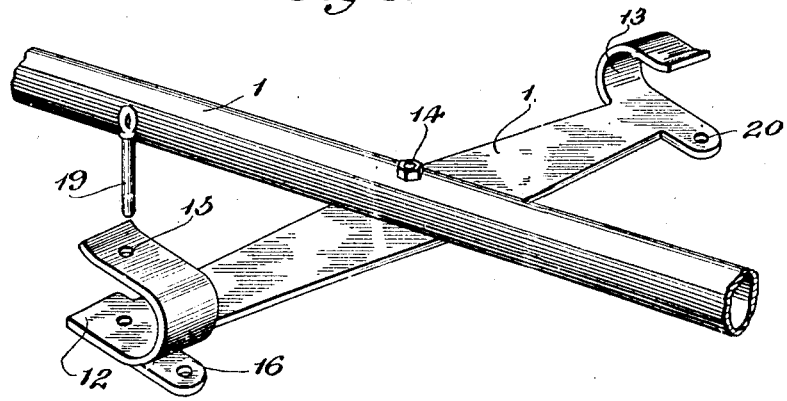
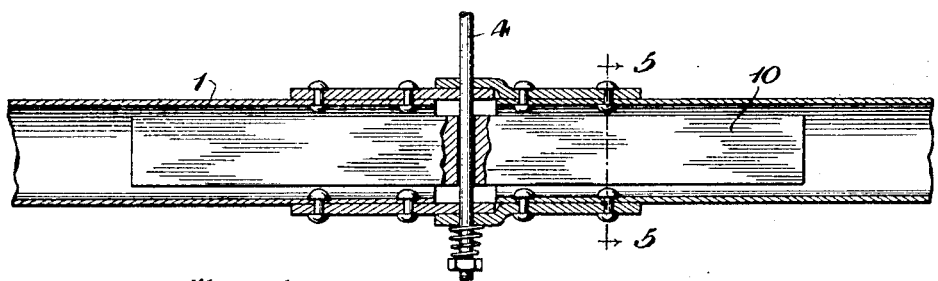
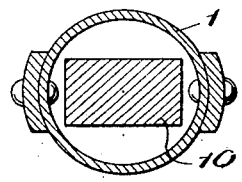
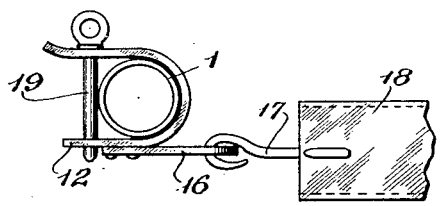

Patented May 22, 1928.

1,670,602

UNITED STATES PATENT OFFICE.

CHARLES E. WEBBER, OF PONTIAC, ILLINOIS.

HARROW.

Application filed September 2, 1927. Serial No. 217,213.

This invention relates to improvements in harrow constructions of the gang type having for an object to provide a harrow of the sort described and claimed in my United States Patent Number 1,567,778 and my copending application for United States patent, Serial Number 177,693, including a novel and advantageous form of draft bar whereby a limited adjusting movement of the same will be permitted to allow the different harrow sections connected thereto to automatically adjust themselves to the surface of a field during the cultivating operation that the clods of earth over which said sections pass will be disintegrated and yet, prevent excessive adjusting movement of the draft bar or its buckling at the junction of the draft connection therewith.

It is an equally important object of the invention to provide a harrow construction wherein a plurality of harrow sections are employed and are so connected to the draft bar that they may be caused to automatically move abreast or in tandem relation according to the line of pull imparted to said bar, connecting bars being used to movably connect the harrow sections to the draft bar whereby to permit the automatic abreast or tandem positioning thereof, the connecting bars being so constructed as to limit the movement of the harrow sections when they are moved to their abreast or transverse relation and to retain the same in such positions so as to cause their effectual functioning when draft is applied to the draft bar from the intermediate portion of the same, but with application of an endwise pull to said draft bar, to permit the harrow sections to automatically move or adjust themselves to their tandem or longitudinal relation.

Other objects of the invention will be in part obvious and in part pointed out hereinafter.

In order that the invention and its mode of operation may be readily understood by those skilled in the art to which it appertains, I have in the accompanying illustrative drawings and the detailed following description based thereupon set out one possible embodiment of the invention.

In these drawings:

Figure 1 is a fragmentary top plan view of a harrow constructed in accordance with my invention showing the improved form of draft and connecting bars, Figure 2 is a similar view wherein the harrow sections have been moved to their tandem or longitudinal relation by the application of an endwise draft to the draft bar, Figure 3 is an enlarged fragmentary detail in perspective showing the mounting of one of the connecting bars upon the draft bar, Figure 4 is an enlarged fragmentary detail, in longitudinal section showing the hinged connection between the several sections of the draft bar and the arrangement of the bracing means in the draft bar adjacent the hinged connection whereby to prevent excessive pivotal movement or buckling of the same, Figure 5 is a transverse section taken on the line 5—5 of Figure 4 looking in the direction in which the arrows point, and Figure 6 is an enlarged fragmentary detail in elevation showing the connection of one portion of one of the connecting bars to the harrow section and the means for securing said connecting bar in substantial parallelism with respect to the draft bar whereby to retain the harrow section connected thereto in its transverse or abreast positioning.

Having more particular reference to the drawings, in connection with which like characters of reference will designate corresponding parts throughout, the invention may be stated to comprise a tubular or pipe like draft bar 1 formed of a length sufficient to permit of the connection of a plurality of harrow sections generally indicated by the numeral 2 thereto; said tubular draft bar 1 being formed of a pair of longitudinally juxtaposed or aligning sections, the adjacent ends of which are provided with metal strap portions indicated by the numeral 3, the free extensions of which are formed with openings through which a draft rod 4 is passed, the inner end of said draft rod being screw threaded and having a coiled spring 5 engaged over the same whereupon a locking nut 6 is turned into engagement with said screw threaded extremity, thus providing an adjustable and resilient draft connection as between the bar 1 and the rod 4; the draft ring or similar device 7 being secured to the outer end of the rod 4 while said outer portion of the draft rod is braced through the medium of bracing bars or rods 8 having their free extremities secured through the medium of eye-bolts 9 or similar devices to portions of the draft bar 1 upon the opposite sides of said rod 4.

At this point, it is to be noted that the hinging of the several sections of the draft bar 1 is in a horizontal plane so that vertical swinging movement of the opposed sections of the draft bar will be permitted and consequently, will allow the various harrow sections 2 connected thereto to automatically adjust themselves to the irregularities of the surface of a field under process of cultivation with the improved harrow. While as stated, it is preferable that this adjustability be afforded the draft bar 1 and the harrow sections 2 connected thereto, it is desirable that means be provided for preventing excessive or undue pivotal adjustment or movement between the several sections of the draft bar 1 and to prevent buckling of the same. To this end, I arrange within the tubular draft bar 1 adjacent the point of hinged connection between the sections thereof a heavy metal bar or rod 10, anchoring said rod against longitudinal movement with respect to the draft bar 1 by forming a transverse opening therein and passing a portion of the draft rod 4 therethrough as is shown in the Figure 4. Consequently upon this arrangement of the bar 10 within the hinged portions of the draft bar sections, it will be appreciated that whereas adjusting pivotal movement to a limited extent will be permitted between the draft bar sections, said sections will be prevented from having excessive pivotal movement and likewise, that when the limit of pivotal movement of the sections of the draft bar 1 is reached, said bar 10 will act as an effectual bracing and stop means therefor, and furthermore will prevent buckling of the draft bar sections at this particular point.

With a view toward providing means for effecting connection between the draft bar 1 and the various harrow sections 2, said draft bar 1 is supplied with a plurality of connecting bars generally indicated at this time by the numeral 11, said bars being preferably formed of heavy sheet metal or of other suitable material and having substantially U-shaped yoke-like devices 12 and 13 formed upon the opposite extremities thereof. Any number of the connecting bars may be provided depending upon the length of the sectional draft bar 1 and, of course, upon the number of harrow sections desired to be connected thereto; each of said connecting bars having king bolts or similar devices 14 passed through the intermediate portions thereof and to bearing openings formed in equi-spaced relation throughout the length of the draft bar 1, whereupon locking nuts are turned into engagement with the screw threaded extremities of said bolts as is illustrated in the Figure 3, thereby providing a pivotal connection of the connecting bars 11 with the draft bar 1.

The yoke-like device 12 upon one end of each of the connecting bars 11 is substantially U-shaped in cross sections and has vertically aligning openings 15 formed in the free extremities thereof whereas an apertured ear 16 is formed adjacent to and extends beyond the closed end portion of the same and as shown in the Figure 3, whereby to permit of the engagement of a connecting link 17 therewith, said link in turn being engaged with one of the channeled supporting or body bars 18 of the adjacent harrow section 2. Furthermore, it is to be noted that the width of the yoke-like device 12 is such as to snugly receive a portion of the tubular draft bar 1 therein in the manner shown in the Figure 6 so that when this embracing engagement is effected, a temporary connection may be had between said yoke-like device 12 and the draft bar 1 by dropping a locking pin 19 through the vertically aligning openings 15. In this way, the equipped connecting bars 11 will be retained in parallelism and against pivotal movement with respect to the draft bar 1.

The remaining yoke-like device 13 upon the opposite extremity of each of the draft bars 11 is substantially U-shaped and of a size to permit of snug embracing engagement with a portion of the draft bar 1, an apertured extension 20 being formed upon one end thereof whereby to permit the connection of the same through a connecting link such as indicated by the numeral 17 to the opposite channel or body bar of the adjacent harrow section 2, as is shown in the Figures 1 and 2. Furthermore, it will be noted in this connection, that the disposition of the yoke-like device 13 upon each of the connecting bars 11 is opposite to that of the yoke-like device 15, that is, when the same opens in opposite direction. Consequently upon this, it will be understood that with swinging or pivotal movement of the connecting bar 11 into parallelism or substantial parallelism to the draft bar 1, each of said yoke like devices 12 and 13 will have embracing engagement with the draft bar as is shown in the Figure 1.

Various forms of harrow sections may be used in connection with the construction hereinbefore described, such as conditions or preferance may dictate, but it is preferable that I employ those forms of harrow sections illustrated in my hereinbefore identified copending application for United States Letters Patent, wherein said draft sections are of a shape that an overlap will be effected as between the meeting and trailing edges of the same and consequently thereupon, will function to fully and completely disintegrate or harrow the soil over which the same pass without the leaving of unharrowed streaks or areas therein by reason of said overlap.

In using the improved harrow, when it is desired to harrow a field with the harrow sections connected thereto, suitable draft means is connected to the draft rod 4 through the connection 7 and the construction is drawn over the surface to be harrowed. At this time, each of the various harrow sections 2 will be automatically swung to their abreast or transverse relation as is shown in the Figure 1 and if it is desired, the connecting bars 11 of each harrow section 2 may be locked in their parallel relation with respect to the draft bar 1 by dropping locking pins 19 through the vertically aligned openings 15 of the various yoke-like devices 12. Consequently upon this, further pivotal movement of the connecting bars 11 with respect to the draft bar 1 will be prevented that retention of the harrow sections in their abreast or transverse relation will be insured. With passing of the harrow over rough or uneven or irregular soil, it will be understood that vertical adjusting pivotal movement will be permitted to be had by the sections of the draft bar 1 by reason of the horizontal pivoting or hinging of the same, that is, the sections thereof and consequently upon this, the various harrow sections 2 will be permitted to automatically adjust themselves to the surface of the field and hence, to effectually harrow the same.

When it is desired to remove the harrow from a field, the least possible width of the construction may be had by disengaging the draft means from the connection 7 of the draft rod 4 and engaging the same with a clevis or similar connection 21 secured to one end of the draft bar 1. At this time, a pull will be applied endwise to the draft bar 1 and with the application of such a pull, the connecting bars 11 will be caused to automatically swing to position at substantially right angles to the draft bar 1, as is shown in the Figure 2, that is, with removal of the locking pins 19 from the openings 15 of the various yoke-like devices 12. By reason of this movement of the connecting bars 11 to right angular positions with respect to the draft bar 1, the harrow sections 2 connected thereto will be automatically moved to their tandem or longitudinal relation as is also shown in said Figure 2 and because of this, it will be understood and appreciated that the width of the harrow will be materially reduced and consequently thereupon, that the same may be drawn or moved through gateways of comparatively restricted size without interference.

Manifestly, the construction shown is capable of considerable modification and such modification as is within the scope of my claims, I consider within the spirit of my invention.

I claim:

1. A harrow including a plurality of toothed sections, a draft bar for said sections, a plurality of connecting bars pivoted intermediate their ends at equi-spaced intervals throughout said draft bar, means on the connecting bars adapted to be engaged with said draft bar with swinging of the former into substantial parallelism with respect to the latter, said means serving to prevent further pivotal movement of the connecting bars in one direction, and means on said connecting bars for joining said toothed sections to the draft bar.

2. A harrow including a plurality of toothed sections, a draft bar, a plurality of connecting bars pivoted intermediate their ends to said draft bar at equi-spaced intervals throughout its length, yoke-like devices fixedly carried upon the opposite extremities of each of said connecting bars transversely of the same, said yoke like devices opening in opposite directions and adapted to have embracing engagement with portions of the draft bar at times, whereby to limit pivotal movement of said connecting bars, and means for connecting said toothed sections to said connecting bars.

3. A harrow including a plurality of toothed sections, a sectional draft bar, sections of which are horizontally pivoted whereby to permit of vertical adjustment of said bar, a draft connection connected to said bar, a plurality of connecting bars pivoted intermediate their ends to said draft bar at intervals throughout its length, substantially yoke-like devices formed upon the opposite extremities of each of said connecting bars and arranged transversely of the same, said yoke like devices opening in opposite directions and adapted to have embracing engagement with portions of the draft bar whereby to limit pivotal movement of the connecting bars with respect to said draft bar, means for releasably connecting one of the yoke-like devices of each of said connecting bars to said draft bar and means for connecting the toothed sections to the connecting bars.

In witness whereof I have hereunto set my hand.

CHARLES E. WEBBER.